Patented Dec. 9, 1952

2,621,201

UNITED STATES PATENT OFFICE 2,621,201

MANUFACTURE OF FERRO-CALCIUM-CITRATE

Adolf Christian Josef Opfermann, Bergisch Gladbach, Germany, assignor to Johann G. W. Opfermann & Sohn, Bergisch, Gladbach, Germany No Drawing. Application August 29, 1950, Serial No. 182,137. In Denmark September 13, 1949

13 Claims. (Cl. 260—439)

The invention relates to ferro-calcium citrate which may be used for therapeutical purposes, particularly for the treatment of secondary anaemia and to the manufacture thereof.

The following ferro-citrates have already been described: ferro-citrate, ferro-ammonium citrate, ferro-sodium citrate and ferro-potassium citrate.

According to the present invention there is provided a process for the manufacture of ferro-calcium citrate which comprises reacting citric acid with ferrum-reductum and with a calcium salt in aqueous solution. The calcium salt is preferably calcium carbonate or calcium citrate.

Ferro-calcium citrate is a hitherto unknown substance and may be produced with various other related processes to that set forth above. For example, the citric acid may be reacted with tri-calcium citrate and thereafter the acid calcium citrate produced reacted with ferrum-reductum or an acid calcium citrate may be reacted in aqueous solution with the ferrum-reductum direct, whilst alternatively an acid ferrous citrate may be reacted with a calcium salt in aqueous solution, the acid ferrous citrate being produced by reaction of an aqueous solution of citric acid with ferrum-reductum.

In order to produce a substantially stable dry product, the water is distilled off the reaction mixture to leave a substantially water-free crystal powder.

Preferably stoichiometrical quantities of the reagents are used, but an excess of the calcium salts and/or citric acid can also be used. Since the ferro-calcium-citrate is sensitive to oxygen, the oxygen from the air should be excluded during the reaction. This is done by the use of a protective gas, such as hydrogen, nitrogen or carbondioxide. A certain protection against oxidation is already afforded by the hydrogen or carbondioxide which are produced during the reaction. However, it is advisable to introduce additional protective gases and to pass the gas through the reaction solution even after the reaction has taken place and preferably even until all the water has been removed by distilling. The water-free compound is fairly resistant to the action of the oxygen from the air.

Ferro-calcium citrate has the formula:

$$CaFe_2(C_6H_5O_7)_2$$

The following examples illustrate the manner in which the invention may be carried into effect:

Example 1

2 mols of citric acid, or multiples thereof, are dissolved in distilled water and in order to drive away the oxygen (e. g. the dissolved air) is heated by bringing it to the boil whilst hydrogen is passed through for half an hour. 2 gram-atoms of ferrum-reductum, i. e. finely-divided reduced iron, are dissolved therein. When the evolution of $H_2$ subsides, the current of inert gas, i. e. the hydrogen, is increased. Acid ferro-citrate is now simply precipitated. By the reaction of 1 mol of $CaCO_3$ with the acid ferro-citrate, the ferro-calcium-citrate ($CaFe_2(C_6H_5O_7)_2$) is formed with evolution of carbon dioxide. The water is now distilled off by heating the reaction vessel up to 200° C., with simultaneous passing through of hydrogen as the inert protective gas, and finally a yellowish-white dry crystal powder is left.

Example 2

A solution consisting of 4 mols of citric acid and water is reacted, after driving away the dissolved air by boiling and passing through of nitrogen (as described in Example 1), with 1 mol of finely powdered tricalcium citrate $$(Ca_3(C_6H_5O_7)_2 + 4H_2O)$$

After the acid calcium citrate has been formed, 6 gram-atoms of ferrum-reductum are dissolved in the reaction mixture and treated in the same manner as in Example 1. The water is again distilled off after the reaction is terminated by heating to 200° C. and passing a current of nitrogen through the solution with exclusion of oxygen. The dry, yellowish-white $$CaFe_2(C_6H_5O_7)_2$$

remains.

| Analysis: | Found Percent | Calculated Percent |
|---|---|---|
| C | 25.5 | 27.1 |
| H | 2.05 | 1.89 |
| $Fe^{II}$ | 21 | 21.1 |
| $Fe^{III}$ | 0.07 | 0.0 |

I claim:

1. As a new compound ferro-calcium-citrate of the formula:

$$CaFe_2(C_6H_5O_7)_2$$

2. Process for the manufacture of ferro-calcium-citrate of the formula:

$$CaFe_2(C_6H_5O_7)_2$$

consisting in that citric acid is reacted in an aqueous solution with ferrum-reductum and a calcium salt and the water is distilled off after completion of the reaction until completely water-free citrate remains.

3. Process according to claim 2, wherein calcium citrate is used as the calcium salt.

4. Process according to claim 2, wherein calcium carbonate is used as the calcium salt.

5. Process according to claim 2, wherein the reaction components are reacted in stoichiometrical proportions.

6. Process according to claim 2, wherein the reaction takes place in the presence of a protective gas.

7. Process according to claim 2, wherein the water is distilled off after completed reaction by means of a current of protective gas.

8. Process for the manufacture of ferro-calcium-citrate of the formula:

$$CaFe_2(C_6H_5O_7)_2$$

consisting in that citric acid is reacted in an aqueous solution with ferrum-reductum and a calcium salt in stoichiometrical quantities in the presence of a protective gas and in that the water is distilled off after completion of the reaction and until completely water-free citrate results, with the help of the current of protective gas.

9. A process for the manufacture of ferro-calcium-citrate which comprises reacting citric acid with ferrum-reductum and with a calcium salt in aqueous solution, the reagents being used in stoichiometrical proportions.

10. A process for the manufacture of ferro-calcium-citrate wherein citric acid in aqueous solution is reacted with tricalcium citrate and the acid calcium citrate thereby produced is reacted with ferrum-reductum, the reagents being used in stoichiometrical proportions.

11. A process for the manufacture of ferro-calcium-citrate wherein an acid calcium citrate is reacted in aqueous solution with ferrum-reductum, the reagents being used in stoichiometrical proportions.

12. A process for the manufacture of ferro-calcium-citrate which comprises reacting acid ferrous citrate with a calcium salt in aqueous solution, the reagents being used in stoichiometrical proportions.

13. A process for the manufacture of ferro-calcium-citrate which comprises reacting citric acid in aqueous solution with ferrum-reductum to produce acid ferrous citrate and the acid ferrous citrate is then reacted with a calcium salt selected from at least one member of the group consisting of calcium carbonate and calcium citrate, the reagents being used in stoichiometrical proportions.

ADOLF CHRISTIAN JOSEF OPFERMANN.

REFERENCES CITED

The following references are of record in the file of this patent:

UNITED STATES PATENTS

| Number | Name | Date |
|---|---|---|
| 2,081,547 | Mattheus | May 25, 1937 |

OTHER REFERENCES

Harada, Institute of Physical and Chemical Research, Scientific Papers (Tokyo), vol. 41, pages 177 to 181—1943.